(12) United States Patent
Young

(10) Patent No.: US 9,815,411 B2
(45) Date of Patent: Nov. 14, 2017

(54) DIVIDER AND METHOD TO PARTITION AN AREA

(71) Applicant: Michael C. Young, Portage, WI (US)

(72) Inventor: Michael C. Young, Portage, WI (US)

( * ) Notice: Subject to any disclaimer, the term of this patent is extended or adjusted under 35 U.S.C. 154(b) by 0 days.

(21) Appl. No.: 15/294,750

(22) Filed: Oct. 16, 2016

(65) Prior Publication Data
US 2017/0174139 A1 Jun. 22, 2017

Related U.S. Application Data

(60) Provisional application No. 62/270,482, filed on Dec. 21, 2015.

(51) Int. Cl.
*B60R 7/02* (2006.01)
*B60R 9/00* (2006.01)
*B65D 25/04* (2006.01)
*B60P 7/08* (2006.01)

(52) U.S. Cl.
CPC .............. *B60R 7/02* (2013.01); *B60P 7/0815* (2013.01); *B60R 9/00* (2013.01); *B65D 25/04* (2013.01)

(58) Field of Classification Search
CPC ................................ B65D 25/04; B60P 7/0815
USPC ........ 220/531; 296/24.4, 24.43, 37.5, 37.16; 16/362–364; 410/129
See application file for complete search history.

(56) References Cited

U.S. PATENT DOCUMENTS

| | | | | |
|---|---|---|---|---|
| 4,189,056 | A * | 2/1980 | Majewski | B60R 7/02 211/181.1 |
| 4,303,367 | A * | 12/1981 | Bott | B60R 7/02 220/495.06 |
| 6,250,700 | B1 * | 6/2001 | Traxler | B60N 2/24 160/135 |
| 7,273,336 | B2 * | 9/2007 | Silamianos | B60P 7/14 410/129 |
| 8,534,734 | B2 * | 9/2013 | Reed | A01K 1/0272 296/24.31 |

* cited by examiner

*Primary Examiner* — Dennis H Pedder
(74) *Attorney, Agent, or Firm* — James Earl Lowe, Jr.

(57) ABSTRACT

A space divider and a method of dividing a space with the space divider including an elongated support and a partition, the method comprising the steps of: supporting the support within the space; and securing a partition to the support so that the partition can rotate between a first position and a second position, the partition being able to translate relative to the support when the partition is in the first position, and the partition not being able to translate relative to the support when the partition is in the second position.

5 Claims, 5 Drawing Sheets

DIVIDER AND METHOD TO PARTITION AN AREA

BACKGROUND

This disclosure is directed to a divider and a method to partition an area in the rear of a vehicle.

SUMMARY

Disclosed is a space divider and a method of dividing a space with the space divider including an elongated support and a partition, the method comprising the steps of: supporting the support within the space; and securing a partition to the support so that the partition can rotate between a first position and a second position, the partition being able to translate relative to the support when the partition is in the first position, and the partition not being able to translate relative to the support when the partition is in the second position.

Figure 1:
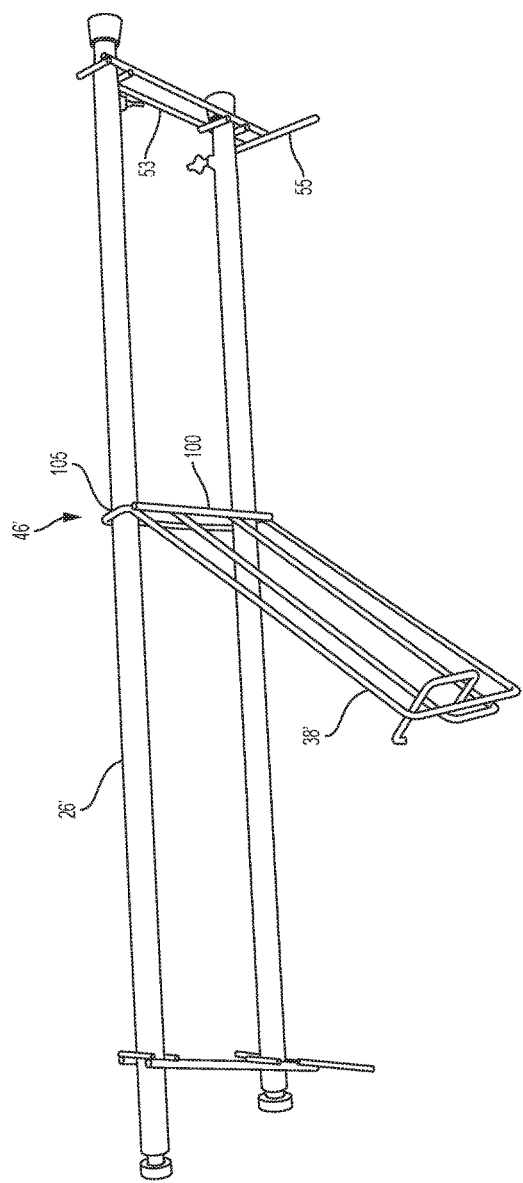
FIG. 1 is a front perspective view of a space divider according to this disclosure. The space divider is shown in a contracted position.

Before one embodiment of the disclosure is explained in detail, it is to be understood that the disclosure is not limited in its application to the details of the construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Further, it is to be understood that such terms as "forward", "rearward", "left", "right", "upward", "downward", "side", "top" and "bottom", etc., are words of convenience and are not to be construed as limiting terms.

DESCRIPTION OF EMBODIMENTS

Figure 2:
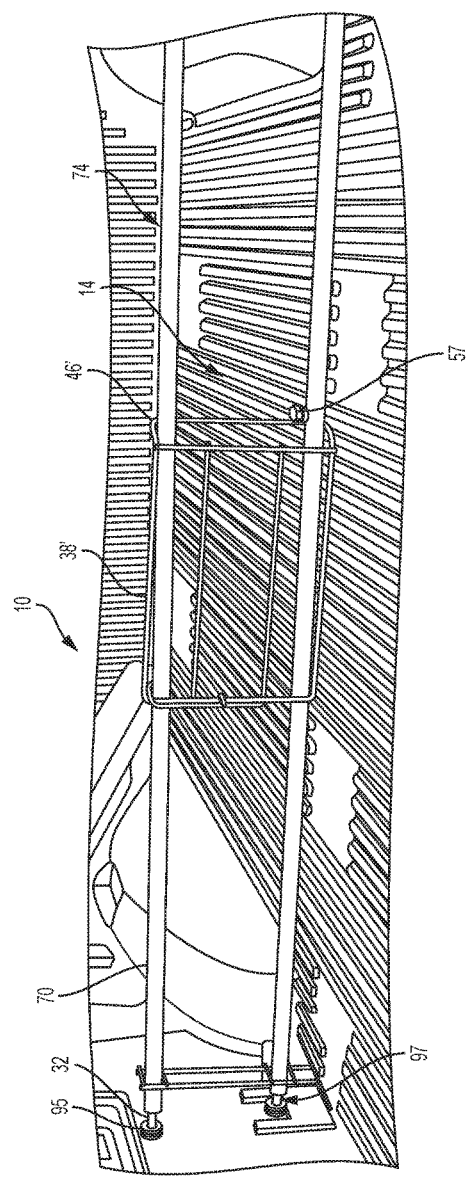
FIG. 2 is a front perspective view of one end of the space divider in FIG. 1. The space divider is shown in an expanded position.

Disclosed and illustrated in FIGS. 1 and 2 is a divider 10 that can be used to partition an area 14. For example, in the trunk of a car, or in the back of a pickup truck, there are large storage areas. But one often doesn't need all of that area to carry one or more items. For example, if one wants to hold a jug of water or milk or a watermelon in the vehicle while moving, placing the item in such a large space results in the item moving around in the space when the vehicle is moved.

It is therefore desirable to add a divider to the large space, so that a smaller area that can confine the item or items is available. With a smaller area, the items will not slide or roll around when the vehicle is moved.

It is also desirable to make the divider resizable, and also removable so that the large space is available when needed.

Figure 3:
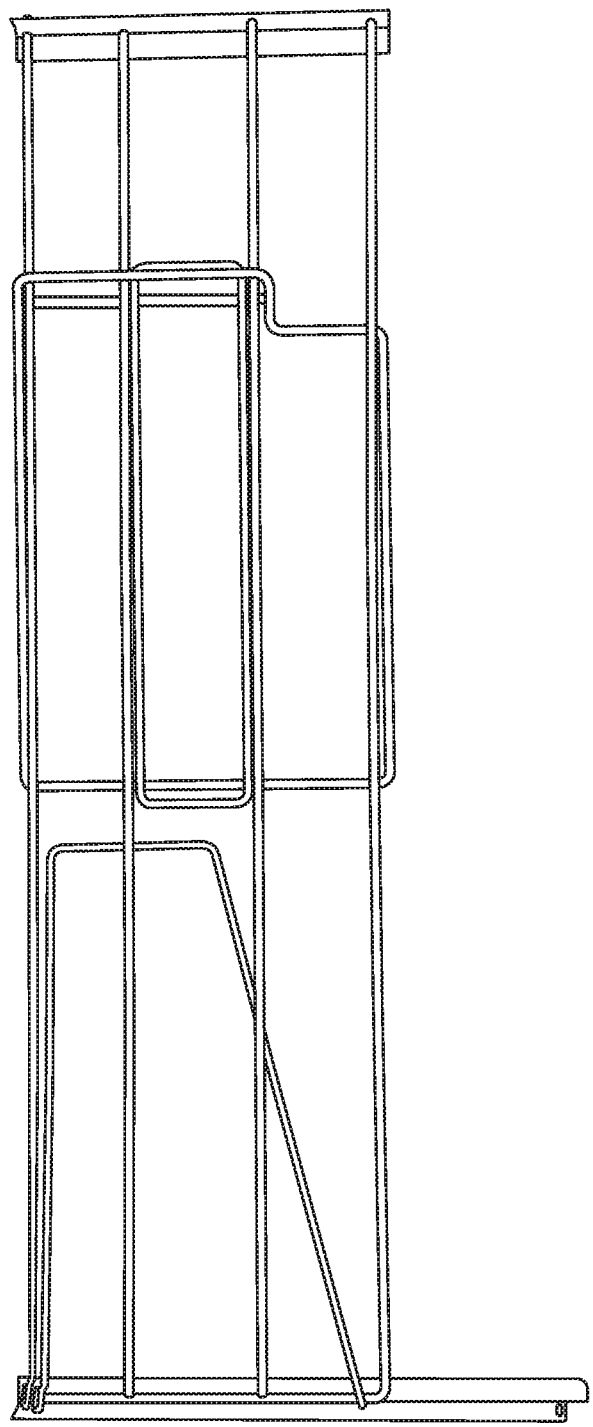
FIG. 3 is a top view of an alternate embodiment of the space divider. The space divider is shown in a collapsed position.
Figure 4:
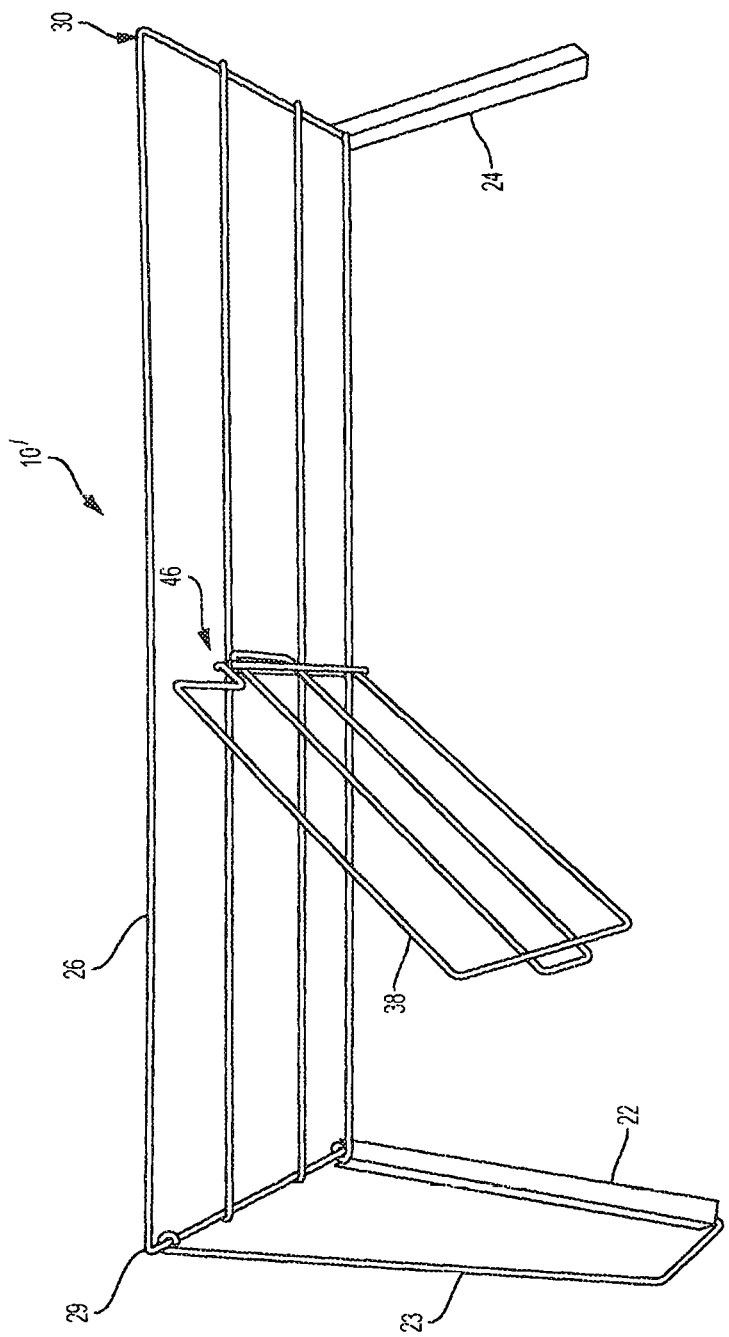
FIG. 4 is a front perspective view of the space divider of FIG. 3. The space divider includes a partition shown in its movable orientation.
Figure 5:
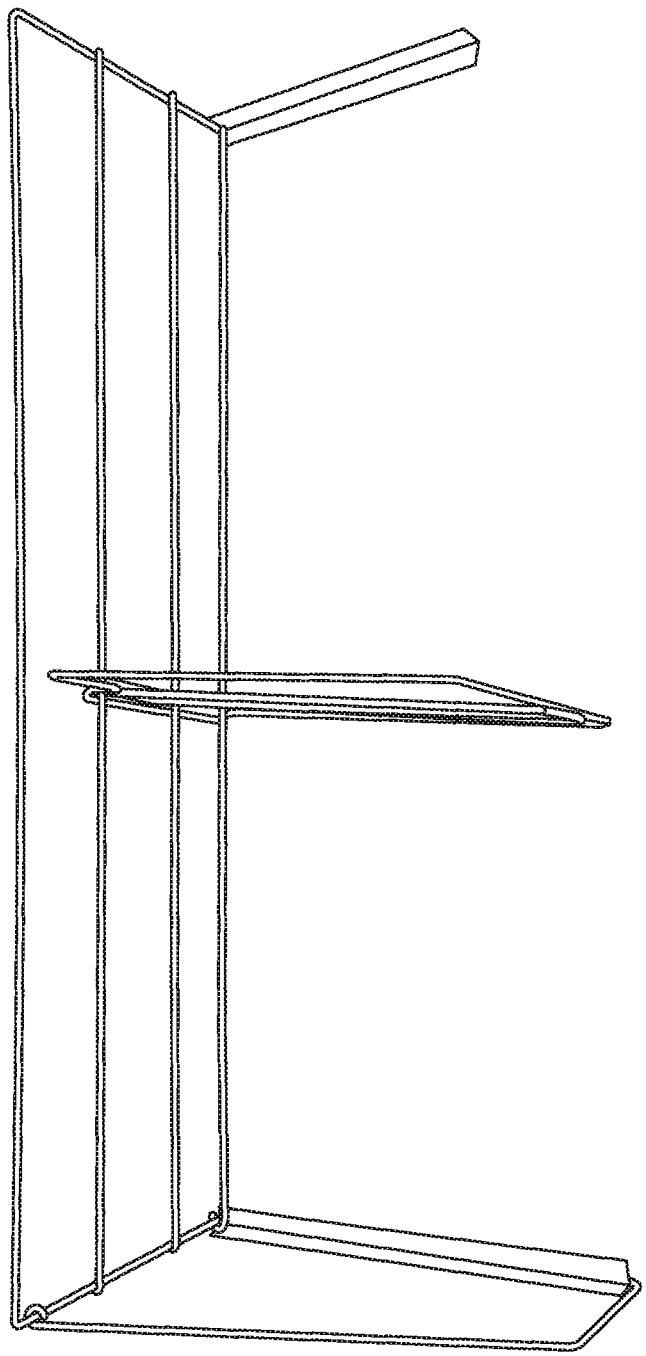
FIG. 5 is a front perspective view of the space divider of FIG. 3. The partition is shown in its fixed orientation.

In an alternate embodiment, as shown in FIGS. 3-5, a removable and resizable divider 10' includes two spaced apart side rails 22 and 24, and a support 26 having two ends 30 and 29 (see FIG. 4) and extending between the side rails 22 and 24. Each support end is attached to its respective side rail and pivotable relative to its respective side rail between a position where the support end is parallel (as shown in FIG. 3) to the side rail, and a position (as shown in FIG. 4) where the support end is perpendicular to the side rail. The divider 10' also includes a partition 38 attached to the support and pivotable relative to the support 26 between a position where the partition 38 is parallel to the support 26, and a position where the partition 38 is perpendicular to the support 26, as shown in FIGS. 3 and 5, respectively. In the illustrated embodiment, a swing arm 23 is pivotally mounted on the left end of the support 26, as shown in FIG. 4, for movement between a position where it lays flat against the support 26, as shown in FIG. 3, and a position where it is perpendicular to the support 26, as shown in FIG. 4. The swing arm provides extra support for holding the support in its raised position, when desired, but can be omitted in other embodiments (not shown).

More particularly, the support 26 is an elongated flat panel (as shown in most FIGS.), and the partition 38 is an elongated flat panel (as shown in FIGS.).

In the disclosed divider 10', each respective support end (29 and 30) is attached to its respective side rail by a pivot mechanism (not shown). And the partition 38 is attached to the support 26 by a pivot mechanism 46 movable along the support 26. The movability of the partition 38 along the support 26 is what allows the divider 10 to be resizable.

As shown in the drawings, the side rails 22 and 24 are elongated, and the support 26 is elongated and can be adapted to extend horizontally. In other embodiments (not shown), a rail can extend between the rear and front ends of the side rails in order to provide additional support to rails.

Means 50 (not shown) is also provided for attaching the side rails 22 and 24 to the area to be partitioned. In the disclosed embodiment, the bottom of the side rails adjacent the trunk flooring is secured to a car trunk by a hook material (not shown) attached to the side rail and by a loop material piece (not shown) adhered to the trunk. In other embodiments (not shown), the hook and loop material can be reversed. One such brand of hook and loop material strips is commonly known as Velcro strips. When it is desired to remove the divider from the car trunk, one only needs to separate the material pieces. The entire divider 10' can also be collapsed, as shown in FIG. 3, and then left in or removed from the car trunk.

To further aid in having the divider 10 ideally suited for partitioning an area, the support can have a variable length so that they can be positioned as desired. More particularly, as shown in FIG. 2, the support includes two telescoping sections 70 and 74 so that the length of the support can be varied. Like components in divider's 10 and 10' have the same numbering, only with an apostrophe.

When it is desired to partition the back of a pickup truck (see FIGS. 1 and 2, the various rails can be omitted, and extensions 95 and 97 (see FIG. 2) can be added to the ends of the support 26' so that the support 26' can be held in a desired location between the sides of a truck bed. More particularly, a threaded bolt or rod 32 in each extension 95 or 97 is received within a threaded opening (not shown) in the support 26'. The rod 32 can travel along the support in the threaded opening. When the extension is extended to where it properly fits within the back of the pickup truck, the respective extension stays engaged with the sides of the pickup truck bed.

Also disclosed is the novel hinge mechanism 46 and a method for securing and pivoting the partition 38 relative to the support 26, while allowing the partition 38 to slide along the support 26 when the partition 38 is not extending perpendicular to the support 26. More particularly, disclosed is a method of dividing a space with a divider 10 including the elongated support 26 and the partition 38, the method comprising the steps of: supporting the support 26 within the space; and securing the partition 38 to the support 26 so that the partition 38 can rotate between a first position and a second position, the partition 38 being able to translate relative to the support 26 when the partition 38 is in the first position, and the partition 38 not being able to translate relative to the support 26 when the partition 38 is in the second position.

More particularly, the partition is elongated along an axis, and the first position is where the elongated axis of the partition is not perpendicular to the support, as shown in FIG. 4, and the second position is where the elongated axis of the partition is perpendicular to the support, as shown in FIG. 5. The divider 10 and 10' includes two or more spaced apart parallel support pieces that together hold the partition 38. In other embodiments (not shown), the divider could include just one support that holds the partition, or more than two.

Further, as illustrated in FIGS. 1 and 2 in connection with the hinge 46', in the disclosed hinge mechanism and method, the partition 38' has an edge 100' that frictionally engages the support 26' when the partition 38' is not able to translate. And the partition 38' is secured at one end to the support by a loop 105 attached to the partition 38', the hinge extending around the support.

In a preferred embodiment, the hinge is an angled loop 105, with each end of the loop being attached to the partition 38'. The end of the loop attached to the partition 38' is long enough so that the loop 105 is spaced apart from the support 26' when the elongated axis of the partition 38' is not perpendicular to the support 26', so that the loop 105 can freely slide along the support 26', and the remainder of the loop is sized so that the edge 100 of the partition 38' is held against the support 26' when the elongated axis of the partition 38' is perpendicular to the support 26'.

In FIGS. 1 and 2, the space divider 10' comprises a first variable length bar or section 70, a second variable length bar or section 74 spaced apart from the first bar, and a pair of spaced apart links 53. Each link is supports a respective end of the first and second bars. The space divider also includes a pair of feet 55, each foot being attached to a respective one end of the links, the one end being spaced apart from where the first link supports the first bar.

More particularly, the length of each variable length bar is freely variable, and the variable length bar includes two telescoping members, one received within the other, and means in the form of a set screw 57 for releasably fixing the position of one of the telescoping members relative to the other. The set screw provides for gross adjustment of the length of the bar, and a fine adjustment in the form of the rotatable threaded extension between the end of the bar and the side of the truck also determines the bar length, together with adjustment nuts, as shown in FIG. 2. The fine adjustment allows for the final tensioning of the bar.

Various other features of this disclosure are set forth in the following claims.

The invention claimed is:

1. A method of dividing a space with a support extending in the space along a support elongate horizontal axis and a partition, the method comprising the steps of: supporting the support within the space; and securing a partition to the support so that the partition can rotate between a first position where the partition is not perpendicular to the support and a second position where the partition is perpendicular to the support, the partition being able to translate relative to the support along the support elongated axis when the partition is in the first position, and the partition not being able to translate relative to the support when the partition is in the second position, wherein the partition has an edge adjacent the support that frictionally engages and does not slide relative to the support when the partition is not able to translate, and the edge slides relative to the support when the partition is able to translate, edge engaging and sliding being determined by the orientation of the partition relative to the support.

2. A method according to claim 1, wherein the partition is elongated along an axis, and the first position is where the elongated axis of the partition is not perpendicular to the elongated axis of the support, and the second position is where the elongated axis of the partition is perpendicular to the elongated axis of the support.

3. A method according to claim 1 wherein the partition is secured at the edge to the support by a hinge that is attached to the partition and that extends around the support.

4. A method according to claim 3 wherein the hinge is an angled loop, with each end of the loop being attached to the partition.

5. A method of dividing a space with an elongated support and a partition, the method comprising the steps of:
   supporting the support within the space; and
   securing a partition to the support so that the partition can rotate between a first position and a second position, the partition being able to translate relative to the support when the partition is in the first position, and the partition not being able to translate relative to the support when the partition is in the second position,
   wherein the partition has an edge that functionally engages the support when the partition is not able to translate, and
   wherein the partition is secured at the edge to the support by a hinge that is attached to the partition and that extends around the support, the hinge being an angled loop, with each end of the loop being attached to the partition, and
   the end of the loop attached to the partition is long enough so that a portion of the loop is spaced apart from the support when the partition is parallel to the support, so that the loop can freely slide along the support, and a remainder of the loop is sized so that the edge of the partition is held against the respective support.

\* \* \* \* \*